US008028229B2

(12) United States Patent
Bailor et al.

(10) Patent No.: US 8,028,229 B2
(45) Date of Patent: Sep. 27, 2011

(54) DOCUMENT MERGE

(75) Inventors: Jonathan Beckett Bailor, Bellevue, WA (US); Ethan Joseph Bernstein, Mercer Island, WA (US); Mark Rolland Knight, Bellevue, WA (US); Christopher James Antos, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 11/951,973

(22) Filed: Dec. 6, 2007

(65) Prior Publication Data
US 2009/0150394 A1   Jun. 11, 2009

(51) Int. Cl.
*G06F 17/00*   (2006.01)
(52) U.S. Cl. ...................................... 715/255
(58) Field of Classification Search .................. 715/200, 715/255
See application file for complete search history.

(56) References Cited

U.S. PATENT DOCUMENTS

| | | | |
|---|---|---|---|
| 4,855,580 A | 8/1989 | Van Maanen, Jr. | |
| 5,107,443 A | 4/1992 | Smith et al. | |
| 5,142,619 A | 8/1992 | Webster, III | |
| 5,313,394 A | 5/1994 | Clapp | |
| 5,339,389 A | 8/1994 | Bates | |
| 5,486,686 A | 1/1996 | Zdybel | |
| 5,568,640 A * | 10/1996 | Nishiyama et al. | 1/1 |
| 5,630,138 A | 5/1997 | Raman | |
| 5,664,186 A | 9/1997 | Bennett et al. | |
| 5,671,428 A | 9/1997 | Muranaga et al. | |
| 5,692,178 A | 11/1997 | Shaughnessy | |
| 5,729,734 A | 3/1998 | Parker | |
| 5,751,958 A | 5/1998 | Zweben | |
| 5,781,732 A | 7/1998 | Adams | |
| 5,787,262 A | 7/1998 | Shakib et al. | |
| 5,963,931 A | 10/1999 | Fagg | |
| 6,000,945 A | 12/1999 | Sanchez-Lazer | |
| 6,006,239 A | 12/1999 | Bhansali | |
| 6,055,546 A | 4/2000 | Pongracz et al. | |

(Continued)

FOREIGN PATENT DOCUMENTS
KR    10-0331685 B1    4/2002
(Continued)

OTHER PUBLICATIONS

Ohst et al., Difference Tools for Analysis and Design Documents, IEEE 2003, pp. 1-10.*

(Continued)

*Primary Examiner* — Cong-Lac Huynh
(74) *Attorney, Agent, or Firm* — Merchant & Gould P.C.

(57) ABSTRACT

Methods and systems of merging a first document with at least a second document to generate a third document. Each of the first and second documents includes at least one data unit. Each data unit is associated with a unit identifier and an edit identifier. The unit identifiers of each of the documents are compared to the unit identifiers of the other document to determine whether each unit identifier is a matching or non-matching unit identifier. Edit identifiers of the data units associated with the matching unit identifiers are compared to each other. Data units associated with the non-matching unit identifiers are inserted directly into the third document. Data units associated with the matching unit identifiers and the matching edit identifiers are inserted directly into the third document. Data units associated with the matching unit identifiers and the non-matching edit identifiers are merged into the third document.

18 Claims, 9 Drawing Sheets

U.S. PATENT DOCUMENTS

| | | | |
|---|---|---|---|
| 6,065,026 A | 5/2000 | Cornelia | |
| 6,067,551 A | 5/2000 | Brown et al. | |
| 6,073,161 A | 6/2000 | Deboskey | |
| 6,088,702 A | 7/2000 | Plantz | |
| 6,202,085 B1 | 3/2001 | Benson et al. | |
| 6,209,010 B1* | 3/2001 | Gauthier et al. | 715/234 |
| 6,209,128 B1 | 3/2001 | Gerard et al. | |
| 6,240,414 B1 | 5/2001 | Beizer | |
| 6,275,935 B1 | 8/2001 | Barlow | |
| 6,317,777 B1 | 11/2001 | Skarbo et al. | |
| 6,327,584 B1 | 12/2001 | Xian et al. | |
| 6,327,611 B1 | 12/2001 | Everingham | |
| 6,341,291 B1 | 1/2002 | Bentley et al. | |
| 6,342,906 B1 | 1/2002 | Kumar | |
| 6,363,352 B1 | 3/2002 | Dailey | |
| 6,411,965 B2 | 6/2002 | Klug | |
| 6,438,548 B1 | 8/2002 | Grim | |
| 6,446,093 B2 | 9/2002 | Tabuchi | |
| 6,529,905 B1 | 3/2003 | Bray et al. | |
| 6,560,620 B1 | 5/2003 | Ching | |
| 6,574,377 B1 | 6/2003 | Cahill | |
| 6,662,209 B2 | 12/2003 | Potts | |
| 6,687,878 B1 | 2/2004 | Eintracht | |
| 6,711,718 B2 | 3/2004 | Pfeil | |
| 6,751,618 B1 | 6/2004 | Germscheid et al. | |
| 6,757,678 B2 | 6/2004 | Myllymaki | |
| 6,757,871 B1 | 6/2004 | Sato et al. | |
| 6,760,840 B1 | 7/2004 | Shimbo | |
| 6,772,165 B2 | 8/2004 | O'Carroll | |
| 6,854,087 B1 | 2/2005 | Takeo et al. | |
| 6,983,416 B1 | 1/2006 | Bae | |
| 7,007,235 B1 | 2/2006 | Hussein et al. | |
| 7,039,679 B2 | 5/2006 | Mendez | |
| 7,058,663 B2 | 6/2006 | Johnston et al. | |
| 7,069,505 B2* | 6/2006 | Tamano | 715/255 |
| 7,127,501 B1 | 10/2006 | Beir | |
| 7,149,776 B1 | 12/2006 | Roy et al. | |
| 7,185,277 B1 | 2/2007 | Bernstein et al. | |
| 7,200,668 B2 | 4/2007 | Mak | |
| 7,209,948 B2 | 4/2007 | Srinivasa | |
| 7,225,189 B1 | 5/2007 | McCormack | |
| 7,249,314 B2 | 7/2007 | Walker et al. | |
| 7,328,243 B2 | 2/2008 | Yeager | |
| 7,401,291 B2* | 7/2008 | Ramaley et al. | 715/255 |
| 7,496,577 B2 | 2/2009 | Williamson | |
| 7,577,906 B2 | 8/2009 | Friedrichowitz | |
| 7,594,163 B2* | 9/2009 | Slack-Smith | 715/200 |
| 7,603,357 B1 | 10/2009 | Gourdol | |
| 7,647,292 B2 | 1/2010 | Hayashi | |
| 7,694,217 B2* | 4/2010 | Croft et al. | 715/229 |
| 7,714,222 B2 | 5/2010 | Taub | |
| 7,761,784 B2* | 7/2010 | Parks et al. | 715/234 |
| 7,839,532 B2* | 11/2010 | Brawn et al. | 358/1.18 |
| 2001/0018697 A1 | 8/2001 | Kunitake et al. | |
| 2002/0007287 A1 | 1/2002 | Straube | |
| 2002/0065848 A1 | 5/2002 | Walker et al. | |
| 2003/0028600 A1 | 2/2003 | Parker | |
| 2003/0093760 A1* | 5/2003 | Suzuki et al. | 715/523 |
| 2003/0097410 A1 | 5/2003 | Atkins | |
| 2003/0097638 A1* | 5/2003 | Tamano | 715/513 |
| 2003/0115481 A1 | 6/2003 | Baird | |
| 2003/0159105 A1* | 8/2003 | Hiebert | 715/500 |
| 2003/0172113 A1 | 9/2003 | Cameron | |
| 2004/0068505 A1 | 4/2004 | Lee | |
| 2004/0107224 A1 | 6/2004 | Bera | |
| 2004/0122870 A1 | 6/2004 | Park | |
| 2004/0122898 A1 | 6/2004 | Srinivasa | |
| 2004/0133858 A1* | 7/2004 | Barnett et al. | 715/530 |
| 2004/0172395 A1 | 9/2004 | Edelstein | |
| 2004/0199550 A1 | 10/2004 | Ito et al. | |
| 2004/0205539 A1* | 10/2004 | Mak et al. | 715/511 |
| 2004/0205653 A1 | 10/2004 | Hadfield et al. | |
| 2004/0230903 A1 | 11/2004 | Elza et al. | |
| 2005/0071386 A1* | 3/2005 | Wolfgang et al. | 707/201 |
| 2005/0097440 A1 | 5/2005 | Lusk et al. | |
| 2005/0210392 A1 | 9/2005 | Koide | |
| 2005/0234943 A1 | 10/2005 | Clarke | |
| 2005/0240858 A1* | 10/2005 | Croft et al. | 715/500 |
| 2005/0289512 A1 | 12/2005 | Matsusaka | |
| 2006/0020360 A1 | 1/2006 | Wu | |
| 2006/0053194 A1 | 3/2006 | Schneider | |
| 2006/0053195 A1 | 3/2006 | Schneider et al. | |
| 2006/0080432 A1 | 4/2006 | Spataro | |
| 2006/0085402 A1 | 4/2006 | Brown et al. | |
| 2006/0101328 A1 | 5/2006 | Albornoz | |
| 2006/0123033 A1 | 6/2006 | Livshits | |
| 2006/0136511 A1 | 6/2006 | Ngo | |
| 2006/0136809 A1* | 6/2006 | Fernstrom | 715/505 |
| 2006/0200755 A1 | 9/2006 | Melmon et al. | |
| 2006/0218476 A1 | 9/2006 | Gombert | |
| 2006/0242549 A1* | 10/2006 | Schwier et al. | 715/500 |
| 2006/0248038 A1 | 11/2006 | Kaplan | |
| 2006/0259524 A1 | 11/2006 | Horton | |
| 2007/0066293 A1 | 3/2007 | Peng | |
| 2007/0118598 A1 | 5/2007 | Bedi et al. | |
| 2007/0130334 A1 | 6/2007 | Carley | |
| 2007/0186157 A1 | 8/2007 | Walker | |
| 2007/0186171 A1 | 8/2007 | Junuzovic | |
| 2007/0198952 A1 | 8/2007 | Pittenger | |
| 2007/0203917 A1 | 8/2007 | Du et al. | |
| 2007/0226320 A1 | 9/2007 | Hager et al. | |
| 2007/0226604 A1 | 9/2007 | Chalasani et al. | |
| 2007/0271502 A1 | 11/2007 | Bedi et al. | |
| 2007/0283321 A1 | 12/2007 | Hegde | |
| 2008/0028300 A1 | 1/2008 | Krieger et al. | |
| 2008/0059539 A1 | 3/2008 | Chin | |
| 2008/0072141 A1 | 3/2008 | Hodel-Widmer | |
| 2008/0097993 A1* | 4/2008 | Nanba | 707/6 |
| 2008/0098294 A1 | 4/2008 | Le | |
| 2008/0114740 A1 | 5/2008 | Vergottini | |
| 2008/0147590 A1* | 6/2008 | Bechtel et al. | 706/59 |
| 2008/0195800 A1 | 8/2008 | Lee | |
| 2008/0294895 A1 | 11/2008 | Bodner | |
| 2009/0006936 A1 | 1/2009 | Parker | |
| 2009/0006948 A1 | 1/2009 | Parker | |
| 2009/0063489 A1 | 3/2009 | Neumann | |
| 2009/0193331 A1* | 7/2009 | Croft et al. | 715/255 |
| 2010/0088676 A1* | 4/2010 | Yuan et al. | 717/120 |

FOREIGN PATENT DOCUMENTS

| | | |
|---|---|---|
| WO | WO 01/33362 A1 | 5/2001 |
| WO | WO 02/33575 | 4/2002 |
| WO | WO 2005/114467 | 12/2005 |
| WO | WO 2007/034858 A1 | 3/2007 |
| WO | WO 2007/062949 | 6/2007 |
| WO | WO 2009/061638 | 5/2009 |
| WO | WO 2009/076010 | 6/2009 |
| WO | WO 2009/079116 | 6/2009 |
| WO | WO 2009/154842 | 12/2009 |

OTHER PUBLICATIONS

Lu et al., Merging Retrieval Results in Hierarchical Peer-to-Pear Networks, ACM 2004, pp. 472-473.*

Heckel, A Technique for Isolating Differences between Files, ACM 1978, pp. 264-268.*

"Google, Google Docs & Spreadsheets Tour" downloaded from http://www.google.com/google-d-s/intl/en/tour2.html on Nov. 9, 2007 (1 page).

Adler et al., "Evaluating and Implementing a Collaborative Office Document System," 2005, pp. 1-18, http://www.sce.carleton.ca/faculty/adler/publications/2005/adler-nash-noel-2005-Collab-Office.pdf.

Citro et al., "Conflict Management for Real-Time Collaborative Editing in Mobile Replicated Architectures," School of Computer Science and Information Technology, RMIT University, Melbourne, Victoria, Australia, Australian Computer Society, Inc. © 2007, pp. 1-10, http://www.crpit.com/confpapers/CRPITV62Citro.pdf.

Green, Bob, "Converting Qedit to the Client/Server Model", http://www.robelle.com/library/papers/client-server/, 14 pages (Copyright 2004).

Haake et al., "Collaborative Authoring of Hypermedia Documents," Machine Translation Today, Translating and the Compute 15, pp. 41-58, Aslib:London 1993, pp. 1-18, http://www.pi6.fernuni-hagen.de/publ/MT-93.pdf.

Hebsgarrd, Poul J; Process Driven Document Management™, Version 6.1, Feb. 2007, pp. 1-13, http://www.brain-technology.com/upload/file_vk306c6tr779p9gntgho_16467.pdf.

Ignat et al., "Extending Real-Time Collaborative Editing Systems with Asynchronous Communication," Institute for Information Systems, ETH Zurich, (at least as early as Oct. 4, 2007) pp. 1-6, http://www.inf.ethz.ch/personal/ignat/Publications/cscwd_04.pdf.

Michael Koch, "Design Issues and Model for a Distributed Multi-User Editor," (pp. 1-21), from *Computer Supported Cooperative Work, An International Journal*, 3(3-4), 1995, pp. 359-378.

Pacull et al., "Duplex: A Distributed Collaborative Editing Environment in Large Scale," *Proceedings of the Conference on Computer Supported Cooperative Work,* Oct. 22-26, 1994, Chapel Hill, NC, USA. ACM, 1994; pp. 165-173.

Preston et al., "Synchronous Editing via Web Services: Combining Heterogeneous Client and Server Technologies," Department of Computer Science, Georgia State University, Atlanta, Georgia, *CSCW 2006*, Nov. 4-8, 2006, Banff, Alberta, Canada, pp. 1-2. http://cims.clayton.edu/jpreston/PhD/Research/Preston%20-%20CSCW%20Demo%20Extended%20Abstract.pdf.

Synchronous Collaborative Text Document Editing Online: MoonEdit, reviewed Sep. 13, 2007, pp. 1-4, http://www.masternewmedia.org/news/2005/02/20/synchronous_collaborative_text_document_editing.htm.

U.S. Appl. No. 11/938,082, filed Nov. 9, 2007, Confirmation No. 3133.

U.S. Appl. No. 11/957,010, filed Dec. 14, 2007, Confirmation No. 8535.

Wilde, Erik, "Multi-User Multimedia Editing with the MultimETH System," Swiss Federal Institute of Technology, CH 8092, Zurich, (at least as early as Oct. 10, 2007) pp. 1-9, http://dret.net/netdret/docs/wilde-tikrep18.pdf.

Adkins et al.; GSS Collaboration in Document Development: Using Group Writer to Improve the Process, Proceedings of the 32nd Hawaii International Conference on System Sciences, Copyright © 1999 IEEE, 11 pages.

International Search Report and Written Opinion for PCT/US2009/039316, mailed Jan. 18, 2010, 11 pages.

"Codeville," http://codeville.org/, 2 pages (Date Retrieved Oct. 9, 2007).

"File Locks-GNU Emacs Lisp Reference Manual"; www.gnu.org/software/emacs/elisp/html_node/File-Locks.html; Mar. 28, 2006; 2 pages.

"Status of Software Reuse 577," http://www.plex86.org/Computer_Folklore/Status-of-Software-Reuse-577.html, 2 pages (Date Retrieved Oct. 9, 2007).

Adkins et al., "GSS Collaboration in Document Development: Using Group Writer to Improve the Process", Proceedings of the 32nd Hawaii International Conference on System Sciences, 1999, 11 pages.

Galli, R., "Journal File Systems in Linux," http://bulma.net/impresion.phtml?nIdNoticia=1154, 15 pages (Jan. 24, 2002).

Masternewmedia; "Synchronous Collaborative Text Document Editing," Feb. 20, 2005, 1 page, http://www.masternewmedia.org/news/2005/02/20/synchronous_collaborative_text_document_editing.htm.

Miller et al.; "Interactive Simultaneous Editing of Multiple Text Regions"; www.co-ode.org/resources/papers/k-cap2007-seidenberg.pdf; Jun. 2001; 15 pages.

Seidenberg et al; "A Methodology for Asynchronous MultiUser Editing of Semantic Web Ontologies"; www.xmpp.org/extensions/xep-0058.html; Mar. 28, 2006; 8 pages.

Shchepin; "XEP-0058: Multi-User Text Editing"; http://groups.csail.mit.edu/uid/projects/simuledit/usenix01.pdf; Oct. 9, 2007; 5 pages.

US Office Action (Non-Final) for U.S. Appl. No. 11/938,082, mailed Dec. 28, 2009.

US Office Action (Non-Final) for U.S. Appl. No. 11/957,010, mailed Mar. 18, 2010.

International Search Report and Written Opinion for PCT/US2008/083862, mailed Mar. 31, 2009, 11 pages.

US Final Office Action for U.S. Appl. No. 11/938,082, mailed Jun. 29, 2010.

US Non-Final Office Action for U.S. Appl. No. 12/044,744, mailed Jul. 26, 2010.

Google, "Share and Collaborate in Real Time," 2008, 1 page, http://www.google.com/google-d-s/intl/en/tour2.html.

McKechan et al., "Design Considerations for Creditor: A Collaborative Report Writing Editor," 10 pages, accessed May 16, 2008, http://userpages.umbc.edu/~jcampbel/Group01/McKechan_paper_iwces3.pdf.

U.S. Appl. No. 12/044,744, filed Mar. 7, 2008, Confirmation No. 7862.

U.S. Appl. No. 12/111,174, filed Apr. 28, 2008, Confirmation No. 6839.

U.S. Appl. No. 12/117,025, filed May 8, 2008, Confirmation No. 8234.

U.S. Appl. No. 12/117,040, filed May 8, 2008, Confirmation No. 8262.

U.S. Appl. No. 12/145,536, filed Jun. 25, 2008, Bailor et al., Confirmation No. 3462.

US Final Office Action for U.S. Appl. No. 11/957,010, mailed Aug. 18, 2010.

US Non-Final Office Action for U.S. Appl. No. 12/117,025, mailed Sep. 21, 2010.

Microsoft Corporation, Compare and Merge Mechanisms, © 2007, 1 page, http://msdn2.microsoft.com/en-us/library/ek8hk7e2(VS.80,d=printer).aspx.

La Fontaine, Robin, Monsell EDM Ltd., Merging XML Files: a new approach providing intelligent merge of XML data sets, Presented at XML Europe 2002, 21 pages, http://www.deltaxml.com/dxml/93/version/default/part/AttachmentData/data/merging-xml-files.pdf.

Tichy, Walter F., RCS—A System for Version Control, Jan. 3, 1991, 20 pages, http://www.svlug.org/teams/rcs.pdf.

International Preliminary Report and Written Opinion for PCT/US/2008/083069 / MS 321999.02 mailed May 29, 2010, 6 pages.

US Final Office Action for U.S. Appl. No. 12/044,744, mailed Nov. 22, 2010, 16 pages.

U.S. Non-Final Office Action for U.S. Appl. No. 12/145,536, mailed Nov. 8, 2010.

U.S. Non-Final Office Action for U.S. Appl. No. 12/044,744, mailed Mar. 25, 2011.

U.S. Notice of Allowance for U.S. Appl. No. 11/938,082, mailed Jan. 4, 2011.

US Final Office Action for U.S. Appl. No. 12/145,536, mailed Apr. 26, 2011.

* cited by examiner

DOCUMENT MERGE

BACKGROUND

Merging is an act of reconciling multiple changes made to different copies of a same document. Most often, it is necessary when a document is modified by two people at the same time. Later, these changes need to be merged into a single new document reflecting the intent of both authors.

A conventional merge can be cumbersome and time-consuming. A more efficient merge is desired.

SUMMARY

As discussed herein, an aspect of some embodiments relates to a method of merging a first document with at least a second document to generate a third document. Each of the first and second documents includes at least one data unit. Each data unit is associated with a unit identifier and an edit identifier. The method includes obtaining the unit identifiers of the data units of the first document. The method also includes obtaining the unit identifiers of the data units of the second document. The unit identifiers of each of the first and second documents are compared to the unit identifiers of the other of the first and second documents to determine whether each of the unit identifiers is a matching unit identifier or a non-matching unit identifier. The matching unit identifiers indicate corresponding data units of the first and second documents. Each of the non-matching unit identifiers indicates a data unit of one of the first and second documents that does not correspond with any data unit of the other of the first and second documents. Edit identifiers of the data units associated with the matching unit identifiers are compared to each other to ascertain matching edit identifiers. Each of the matching edit identifiers indicates the data unit of one of the first and second documents matches the corresponding data unit of the other of the first and second documents. Data units of the first and second documents associated with non-matching unit identifiers are inserted directly into the third document. In addition, data units of the first and second documents associated with matching unit identifiers and matching edit identifiers are inserted directly into the third document. Finally, data units of the first and second documents associated with matching unit identifiers and non-matching edit identifiers are merged into the third document.

Another aspect of some embodiments relates to a document processing system. The document processing system includes a document processing application and a first document. The document processing application is configured to merge together at least two documents to generate a third document. The first document is configured to be processed by the document processing application. The first document stores content and metadata. The content includes at least one data unit. The metadata includes a unit identifier and an edit identifier associated with each data unit. The unit identifier of each data unit is generated when the data unit is created. The edit identifier of each data unit is generated when a modification to the data unit is saved.

Further aspects relate to a computer-readable storage medium having computer-executable instructions for implementing a method of generating a merged document from a first document and a second document. The method includes determining whether the first document has a first document identifier and whether the second document has a second document identifier. The method also includes obtaining one of the first and second document identifiers if one of the first and second documents has one of the first and second document identifiers. The method further includes comparing the first document identifier of the first document to the second document identifier of the second document. The methods includes performing a conventional merge of the first and second documents to generate the merged document if any of the first and second documents does not have a document identifier. Moreover, the method includes performing a conventional merge of the first and second documents to generate the merged document if the first document identifier differs from the second document identifier. Finally, the method includes performing an accelerated merge of the first and second documents to generate the merged document set if the first document identifier matches the second document identifier.

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

DETAILED DESCRIPTION

Figure 1:
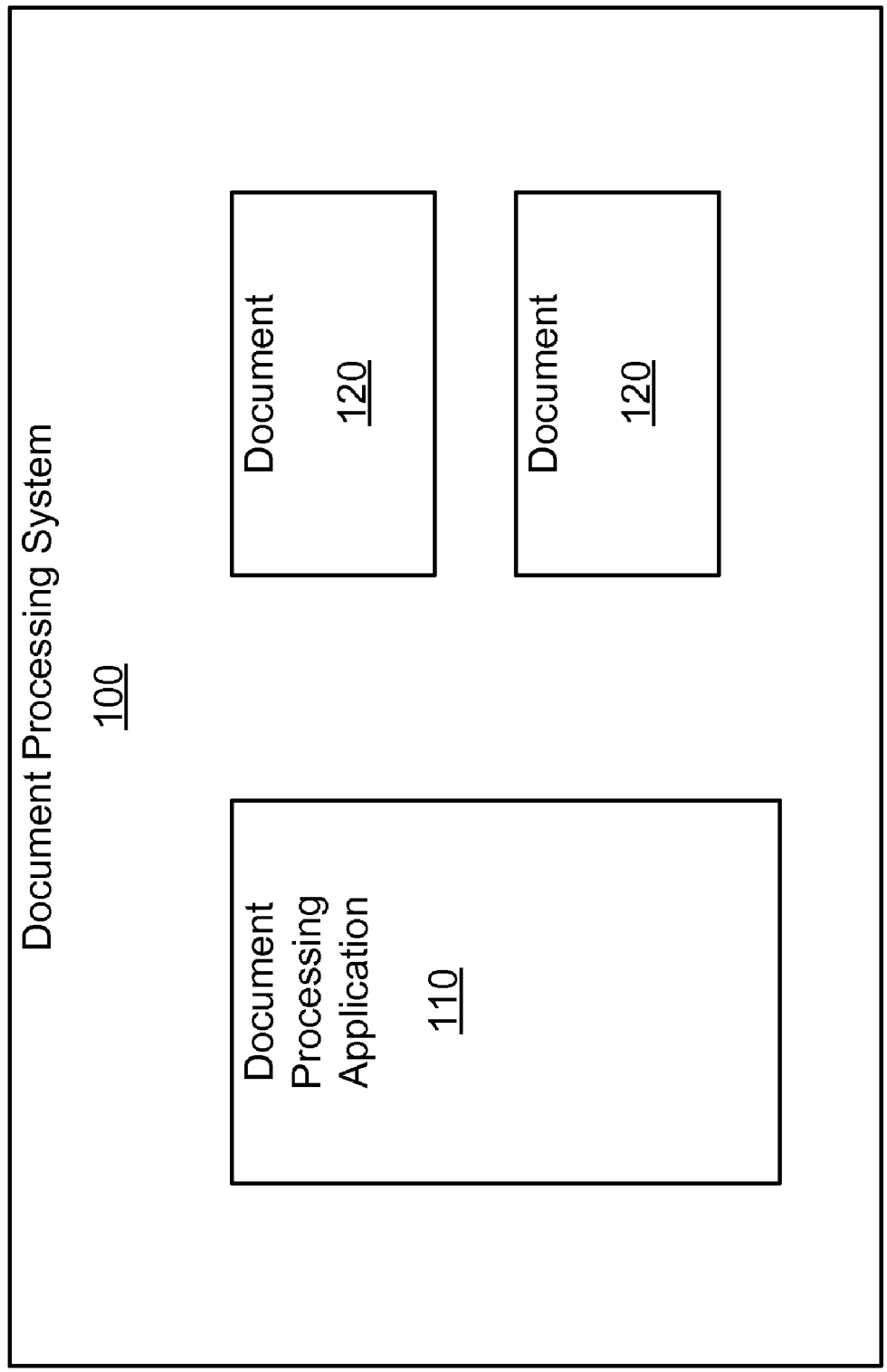
FIG. 1 is a block diagram of an exemplary document processing system.

This disclosure will now more fully describe exemplary embodiments with reference to the accompanying drawings, in which specific embodiments are shown. Other aspects may, however, be embodied many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments of the present disclosure generally relate to a document merge. In one non-limiting example, merging a first document with at least a second document to generate a third document is described. Each of the first and second documents includes at least one data unit. Each data unit is associated with a unit identifier and an edit identifier. Further embodiments relate to a document processing system. The document processing system includes a document processing application which is configured to merge together at least two documents to generate a third document.

FIG. 1 is a block diagram of an exemplary document processing system. The document processing system 100 includes a document processing application 110 and documents 120. The document processing application 110 is configured to merge together the documents 120 to generate a merged document. In alternative embodiments, the document processing application 110 is configured to merge together three, four or more documents to generate a merged document.

In one possible embodiment, the document processing application 110 is a word processing application such as, but not limited to, a MICROSOFT® Office Word application. In other possible embodiments, the document processing system 100 is an image, data, voice, or any other suitable document processing system. Similarly, the document processing application 110 can also be an image, data, voice, or any other suitable document processing application such as, but not limited to, a Microsoft® Office POWERPOINT®, EXCEL®, VISIO®, ACCESS™, and OUTLOOK® software application. The documents 120 can be text or rich text documents, presentations, spreadsheets, drawings, data, emails, and any other documents in a suitable format.

Figure 2:
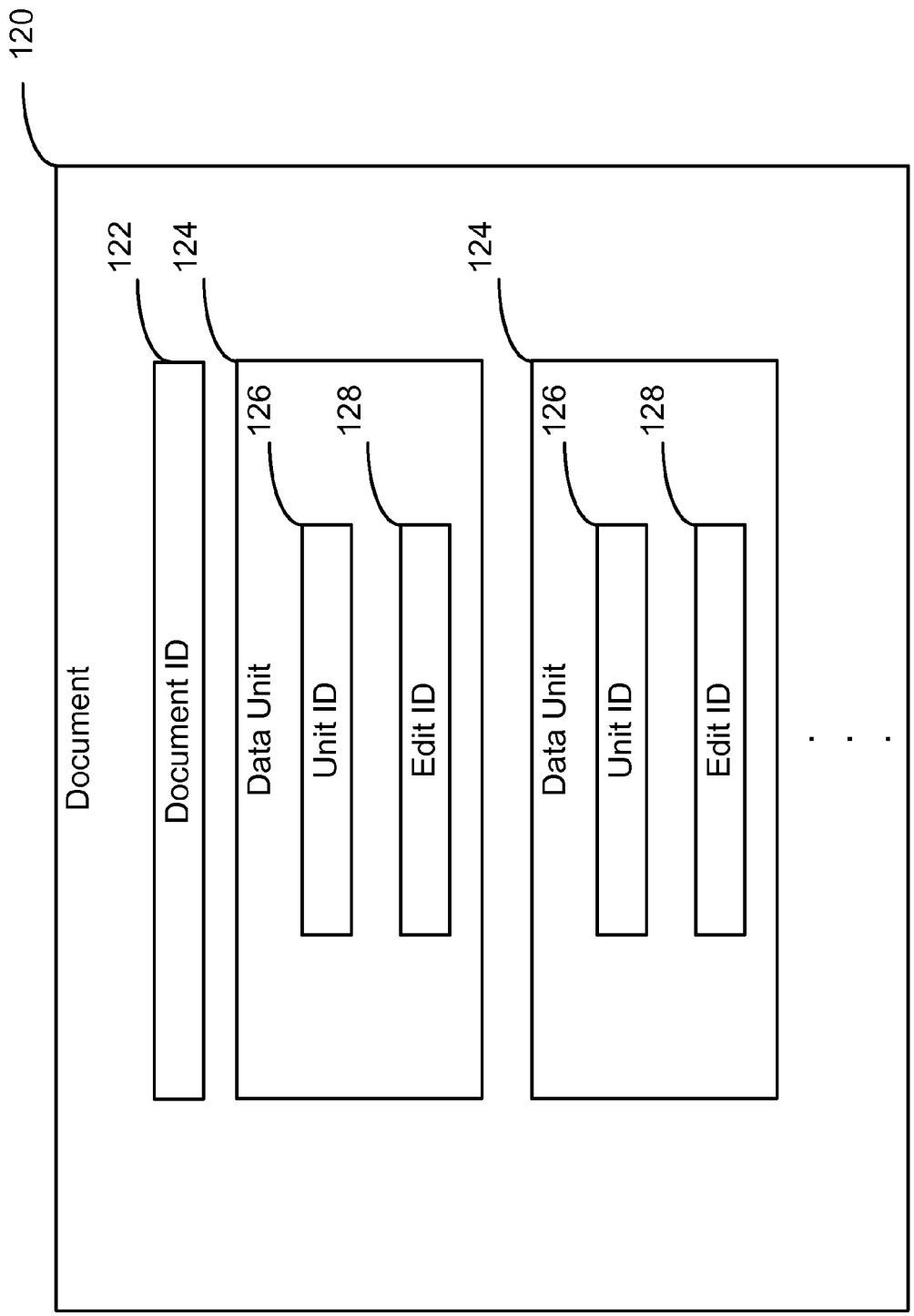
FIG. 2 is a block diagram illustrating an exemplary document configured to be processed by an exemplary document processing application of FIG. 1.

FIG. 2 is a block diagram illustrating an exemplary document 120 which is configured to be processed by an exemplary document processing application 110 in FIG. 1. The document 120 is divided into one or more data units 124. Each data unit 124 is assigned a unique unit identifier 126 that persists for the life of the data unit 124. The unit identifier 126 identifies and distinguishes the associated data unit 124 from any other data units in the document 120.

The data unit 124 is also assigned an edit identifier 128 when the data unit 124 is created, edited or modified. In particular, whenever the data unit 124 is created, edited or modified, a new edit identifier 128 is assigned to the data unit 124 so that the new edit identifier 128 replaces the previous edit identifier (if any) of the data unit 124. The new edit identifier 128 is different from the previous edit identifier (if any) of the data unit 124. In one possible embodiment, the edit identifier 128 is randomly generated.

In example embodiments, the document 120 is broken into data units 124 by using a variety of methods. For example, if the document 120 is a text document, each paragraph of the document can be broken into a separate data unit. In other words, in the example of a text document, the data unit 124 can also be called a paragraph. In such an example, the unit identifiers 126 are referred to as paragraph identifiers. In other types of documents, other methods can be used to break the document 120 into data units. For example, objects, graphics, slides, or other selectable items within a document can be used to break the document into separate data units.

The unit identifier 126 and the edit identifier 128 can be in any suitable format to identify the data unit 124. One possible exemplary format of the unit identifier 126 and the edit identifier 128 is a combination of numbers, letters, and/or symbols, such as a 32-bit integer. A person skilled in the art will appreciate many other suitable identifier formats for the unit identifier 126 and the edit identifier 128. The unit identifier 126 and the edit identifier 128 can be stored in the document 120, in a separate file or in any other suitable storable and accessible medium. Some exemplary formats of storing the unit identifier 126 and the edit identifier 128 are discussed below in more detail in FIGS. 3-4.

The document 120 also includes a document identifier 122 to identify the document 120. In one possible embodiment, the document identifier 122 is assigned to the document 120 when the document 120 is newly created. In another possible embodiment, the document identifier 122 is assigned to the document 120 when the document 120 has no document identifier. For example, a document identifier 122 is assigned to the document 120 when the document 120 is previously edited by an application that does not recognize unit or edit identifiers.

The document identifier 122 is unique and persistent when the document identifier 122 is assigned to the document 120. In other words, the document identifier 122 persists for the life of the document 120. Even when the document 120 is edited and modified, the document identifier 122 does not change. In addition, when a separate document is created from the document 120, the document identifier 122 stays with the separate document. This can occur when a user copies a document to a new document, or when multiple user copies of the document are created to allow for multiple users to edit the same document.

Figure 3:
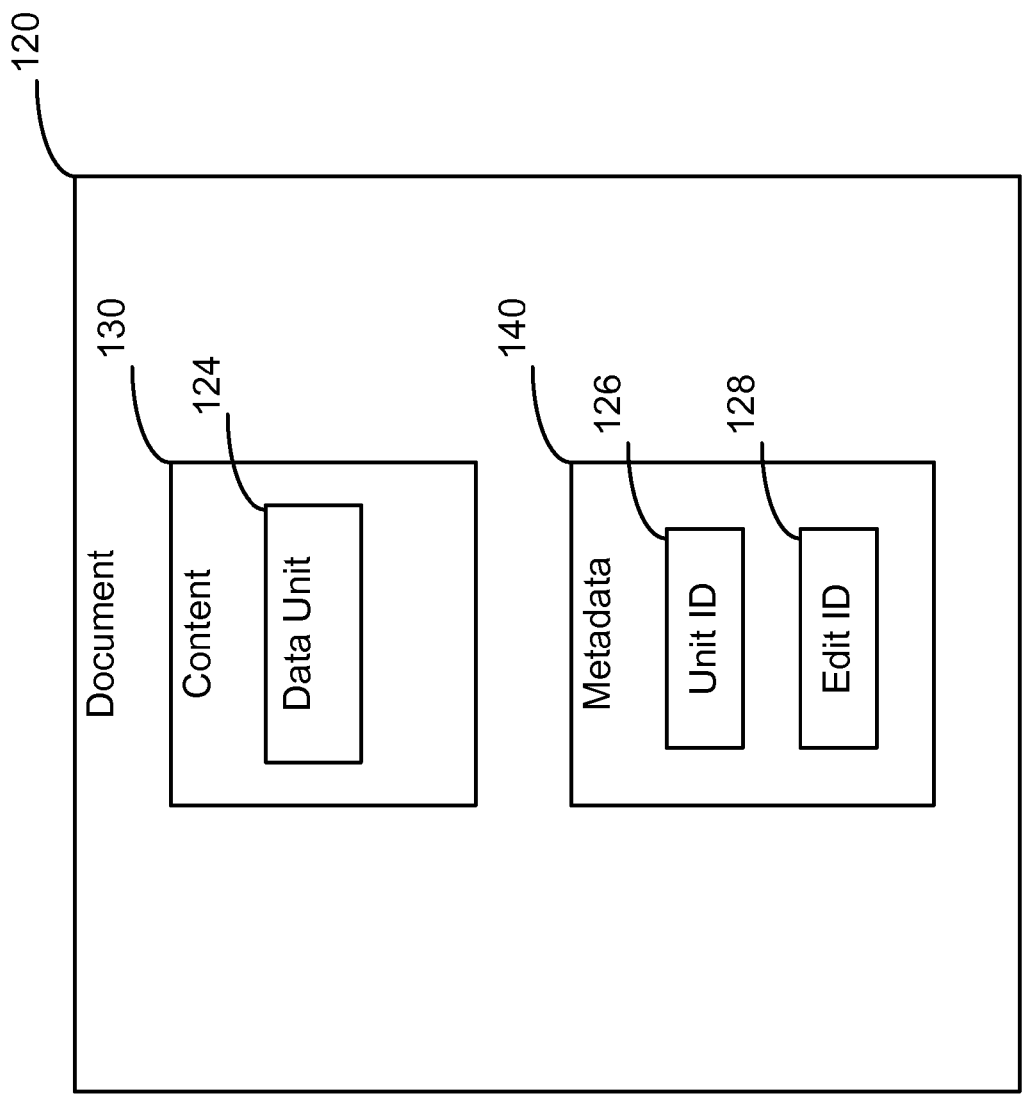
FIG. 3 is a block diagram illustrating an exemplary format for the document shown in FIG. 2.

FIG. 3 is a block diagram illustrating an exemplary format for the document 120 shown in FIG. 2. In particular, the document 120 includes a content 130 and a metadata 140. The document 120 stores the content 130 and the metadata 140. The content 130 includes at least one data unit 124. The metadata 140 includes a unit identifier 126 and an edit identifier 128 which are associated with each data unit 124. The unit identifier 126 is generated when the data unit 124 is created. The edit identifier 128 is generated whenever a modification to the data unit 124 is stored within the document. The metadata 140 is stored in the document 120.

Figure 4:
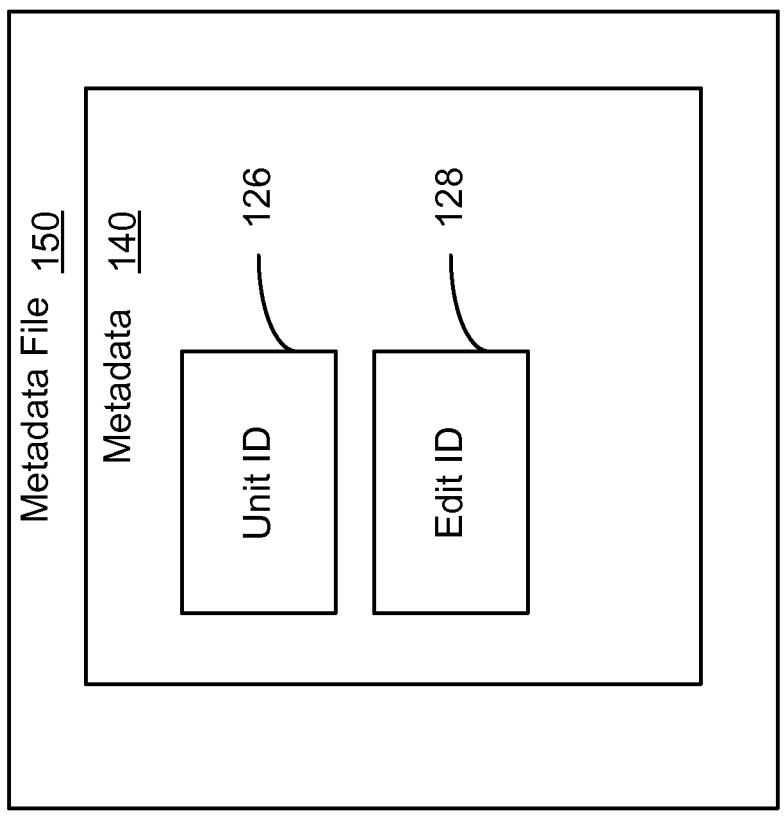
FIG. 4 is a block diagram illustrating another exemplary document similar to that shown in FIG. 3, except that a metadata file is stored separately from the document.
Figure 4:
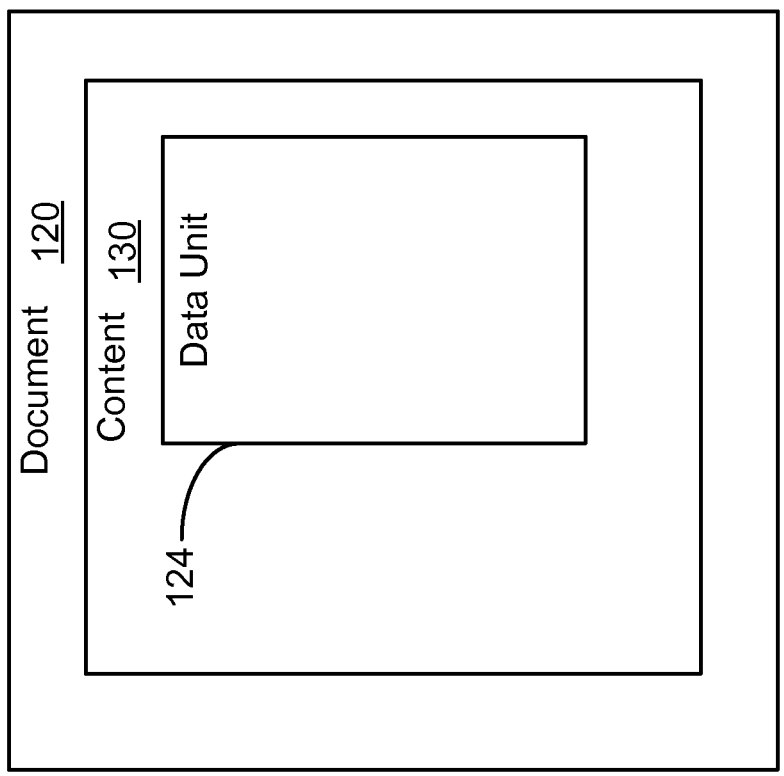

FIG. 4 is a block diagram illustrating another exemplary document 120 similar to that shown in FIG. 3, except that a metadata file 150 is stored separately from the document 120. Preferably, the metadata file 150 includes a metadata 140 which pertains to content 130 of the document 120. The metadata 140 of the metadata file 150 includes a unit identifier 126 which indicates to which data unit 124 the metadata 140 pertains. In one possible embodiment, the metadata 140 can also include an edit identifier 128. The data unit 124 is indicated by the unit identifier 126 included in the metadata 140.

Figure 5:
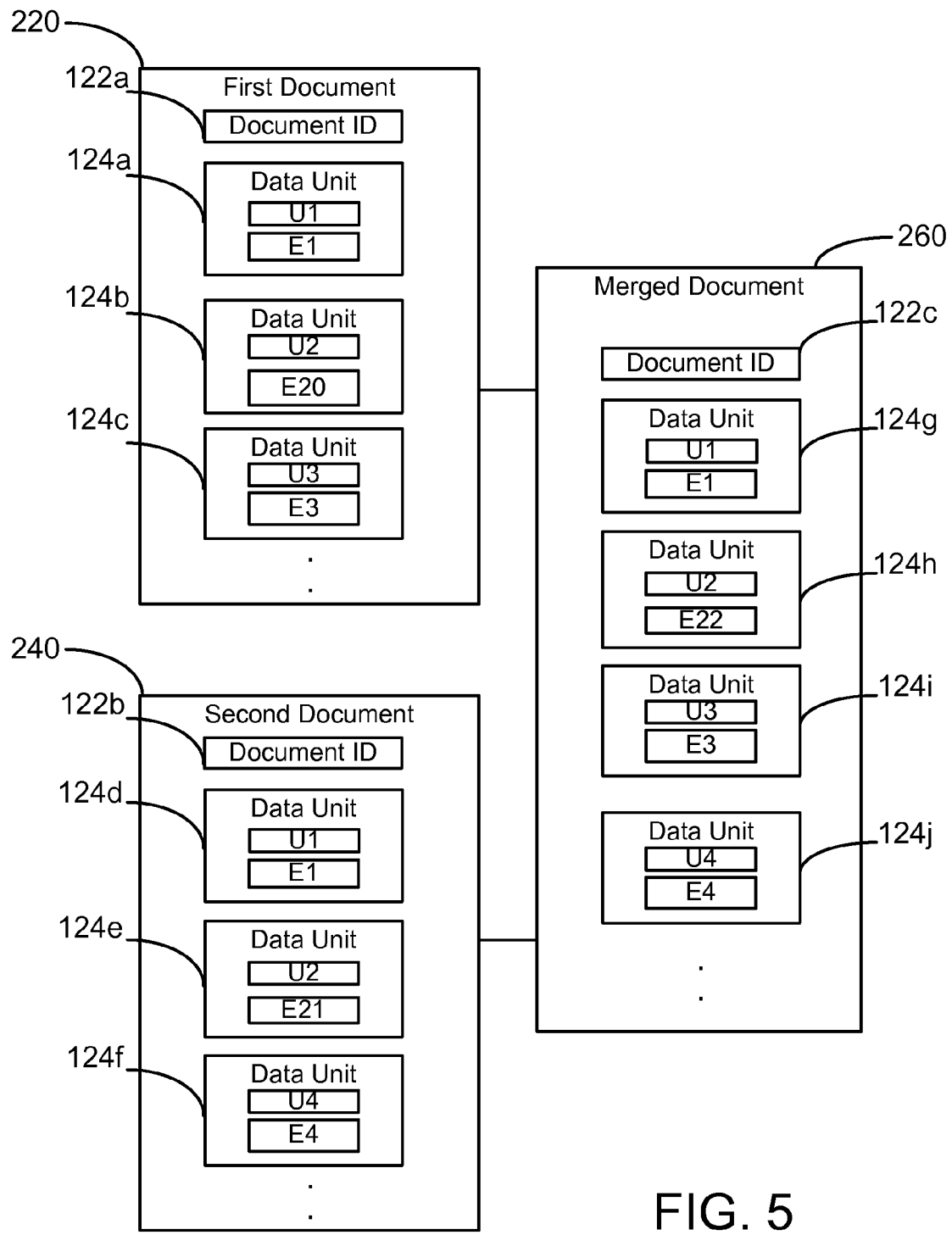
FIG. 5 is a block diagram illustrating merging a first document with a second document to generate a third document.

FIG. 5 is a block diagram illustrating merging a first document 220 with a second document 240 to generate a third document 260. Exemplary structures of the first document 220 and the second document 240 are described above in FIGS. 1-4. The third document 260 is a merged document created by merging the first document 220 and the second document 240.

In an example shown in FIG. 5, the first document 220 includes a first document identifier 122a and data units 124a-c. The first document identifier 122a identifies the first document 220. Three data units 124a-c are shown in FIG. 5, however, the first document 220 may include more or less than three data units. As to the shown data units 124a-c, the data unit 124a has a unit identifier U1 and an edit identifier E1 which are associated with the data unit 124a. The data unit 124b has a unit identifier U2 and an edit identifier E20 associated with the data unit 124b. The data unit 124c has a unit identifier U3 and an edit identifier E3 associated with the data unit 124c.

Similarly, the second document 240 includes a second document identifier 122b and data units 124d-f. The second document identifier 122b identifies the second document 240. Three data units 124d-f are shown in FIG. 5, however, the second document 240 may include more or less than three data units. The data unit 124d has a unit identifier U1 and an edit identifier E1 associated with the data unit 124d. The data unit 124e has a unit identifier U2 and an edit identifier E21 associated with the data unit 124e. As it is noted, the edit identifier E21 of the data unit 124e in the second document 240 is different from the edit identifier E20 of the data unit 124b in the first document 220. The data unit 124f has a unit identifier U4 and an edit identifier E4 associated with the data unit 124f.

In the exemplary merge shown in FIG. 5, the first document identifier 122a of the first document 220 is same as the second document identifier 122b of the second document 240. The first document 220 and the second document 240 are thus performed in an accelerated merge as described in detail as follows. Since the first document 220 and the second document 240 have the same document identifier, the first and second documents 220, 240 share a common origin or parent. As such, the first document 220 can be merged with the second document 240 using one or more of the accelerated merging processes described below.

The data unit 124a of the first document 220 has a same unit identifier U1 and edit identifier E1 as the data unit 124d of the second document 240. The data unit 124a therefore is indicated as the same as the data unit 124d. In other words, the data unit 124d has not been changed or modified from the data unit 124a. Accordingly, no merge is needed between the data unit 124a and the data unit 124d. Rather, the data unit 124a (or the data unit 124d which is same as the data unit 124a) is directly inserted into the third document 260 as noted as a data unit 124g. Since there is no merge necessary between the data unit 124a and the data unit 124d, the data unit 124g in the merged document (i.e., the third document) 260 keeps the unit identifier U1 and the edit identifier E1 associated with it. This direct insertion without further comparing the contents in the data unit 124a with the contents in the data unit 124d can save time, improve efficiency, and enhance merge precision.

The data unit 124b and the data unit 124e have a same unit identifier U2, but have different edit identifiers E20, E21. Different edit identifiers E20, E21 indicate that the data unit 124b and the data unit 124e may be different. In other words, a merge between the data unit 124b and the data unit 124e is needed. Therefore, a data unit 124h in the third document 260 is generated from a merge between the data unit 124b and the data unit 124e. The unit identifier U2 is kept in the data unit 124h. A new edit identifier E22 is created in the merge of the two data units 124b and 124e.

The data unit 124c of the first document 220 cannot be found to have any data unit in the second document 240 which has a matching unit identifier with the unit identifier U3 of the data unit 124c. Thus, the data unit 124c is directly inserted into the third document 260 without a merge and is noted as a data unit 124i in the third document 260. The data unit 124i thus includes the unit identifier U3 and the edit identifier E3 associated with the date unit 124i. The data unit 124i in the third document 260 is exactly same as the data unit 124c in the first document 220. In one possible embodiment, the data unit 124c is directly attached into the end of the third document 260. In another possible embodiment, the data unit 124c (without a merge of contents of the data unit 124c) is sorted to be inserted into a proper location of the third document 260 according to relationships among the data units 124a-j.

Similarly, the data unit 124f of the second document cannot be found to have any data unit in the first document 220 which has a matching unit identifier with a unit identifier U4 of the data unit 124f. Therefore, the data unit 124f is directly inserted into the third document 260 without a merge and is noted as a data unit 124j in the third document 260. The data unit 124j thus includes the unit identifier U4 and the edit identifier E4 associated with the date unit 124j. The data unit 124j in the third document 260 is exactly same as the data unit 124f in the second document 240. In one possible embodiment, the data unit 124f is directly attached into the end of the third document 260. In another possible embodiment, the data unit 124f (without a merge of contents of the data unit 124f) is sorted to be inserted into a proper location of the third document 260 according to relationships among the data units 124a-j.

The merged document 260 thus includes the data units 124g-j. Each of the data units 124g-j is also associated with a unit identifier and an edit identifier. In addition, the document identifier 122a (or 122b which is same as 122a) stays in the merged document 260 and is noted as a document identifier 122c in FIG. 5.

In another possible embodiment, if the document identifier 122a of the first document 220 is different from the document identifier 122b of the second document 240, a conventional merge is performed between the first document and the second document. In yet another possible embodiment, if any of the first and second documents 220, 240 does not have a document identifier, a conventional merge will be performed to generate the third document.

The example in FIG. 5 shows merging two documents together to a merged third document. However, it is not limited to merging only two documents. Instead, the concept and principle illustrated herein can apply to merging more than two documents.

Figure 6:
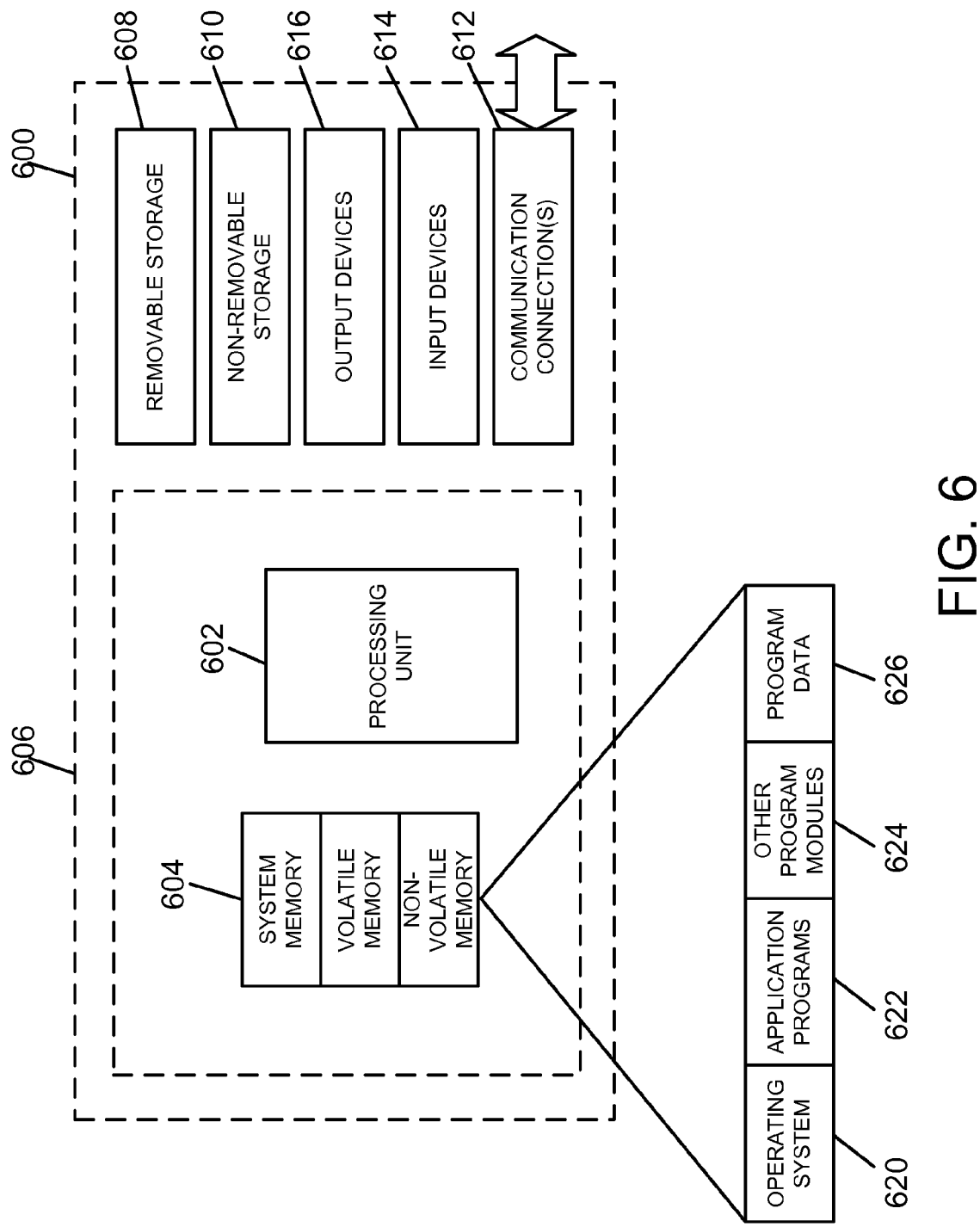
FIG. 6 is an exemplary computing system for implementing aspects of the present disclosure.

FIG. 6 is an exemplary computing system 600 for implementing aspects of the present disclosure. For example, computing system 600 can be a document processing system 100 as discussed above that is used to create one and/or merge two or more documents such as the documents 220, 240 described above. In its most basic configuration, computing system 600 typically includes at least one processing unit 602 and memory 604. Depending on the exact configuration and type of computing system, memory 604 may be volatile (such as RAM), non-volatile (such as ROM, flash memory, etc.) or some combination of the two. This most basic configuration is illustrated in FIG. 6 by dashed line 606. Additionally, computing system 600 may also have additional features/functionality. For example, computing system 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing system 600. Any such computer storage media may be part of computing system 600.

Computing system 600 may also contain communications connection(s) 612 that allow the computing system to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing system 600 may also have input device(s) 614 such as keyboard, mouse, pen, voice input device, touch input device, etc. Output device(s) 616 such as a display, speakers, printer, etc. may also be included. All these devices are well known in the art and need not be discussed at length here.

In some embodiments, memory 604 includes one or more of operating system 620, application programs 622, other program modules 624, and program data 626. For example, application programs 622 can include a text or word processing application that is used to create and/or merge two or more documents.

Figure 7:
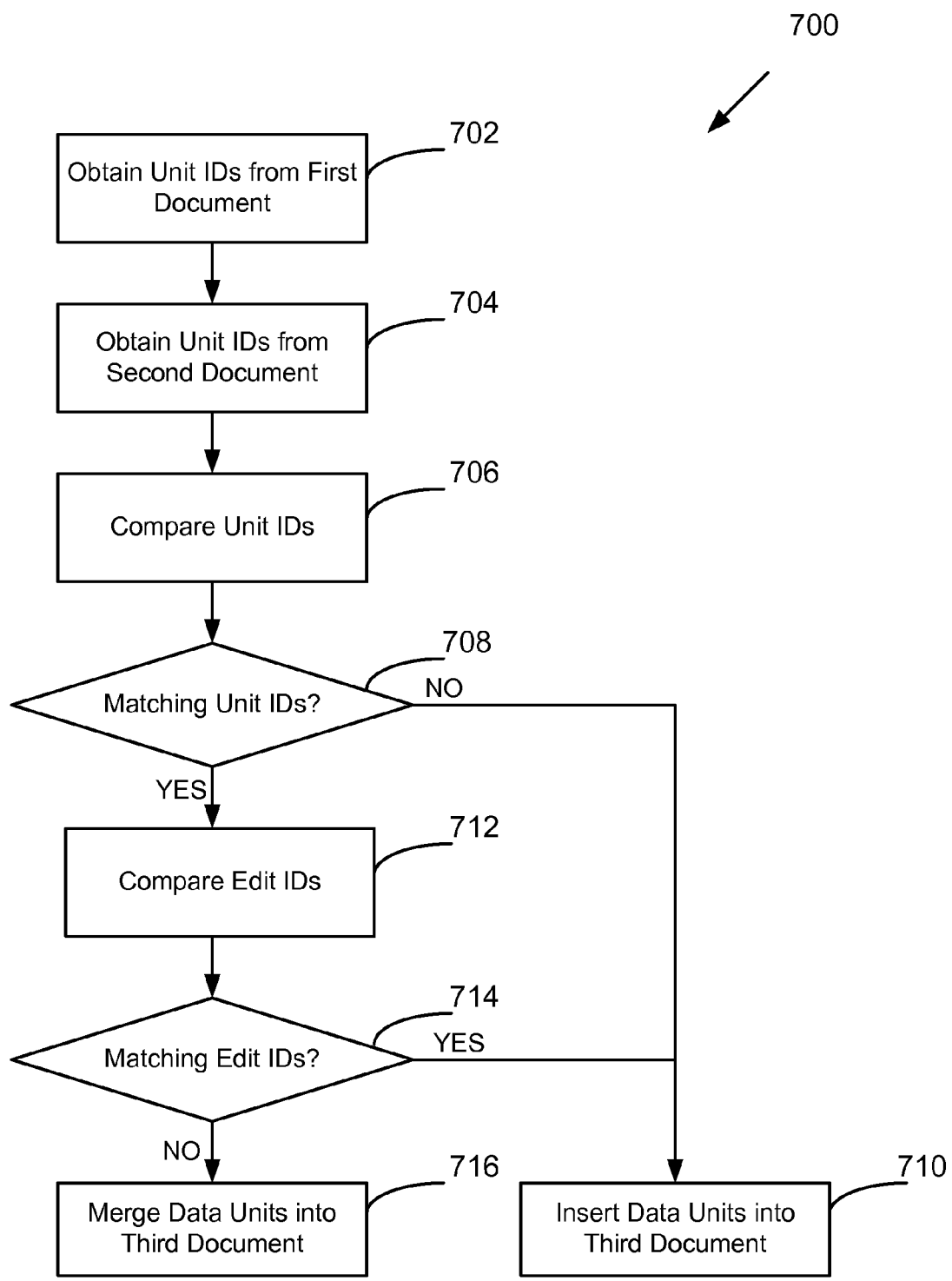
FIG. 7 illustrates an example method of merging a first document with a second document to generate a third document.

FIG. 7 illustrates an example method 700 of merging a first document with a second document to generate a third document. In the method shown, each of the first and second documents includes at least one data unit. Each data unit is associated with a unit identifier and an edit identifier. A document processing application is configured to merge together the first and second documents to generate the third document. As discussed above, in one possible embodiment, the documents are text documents.

At operation 702, the document processing application obtains the unit identifiers of the data units of the first document. In one possible embodiment, the unit identifiers are stored within the first document. In another possible embodiment, the unit identifiers are stored in a metadata file which is separated from the first document.

Operational flow proceeds to an operation 704. At the operation 704, the document processing application obtains the unit identifiers of the data units of the second document. In one possible embodiment, the unit identifiers are stored within the second document. In another possible embodiment, the unit identifiers are stored in a metadata file which is separated from the second document.

Operational flow proceeds to an operation 706. At the operation 706, the document processing application compares the unit identifiers of each of the first and second documents to the unit identifiers of the other of the first and second documents to determine whether each of the unit identifiers is a matching unit identifier or a non-matching unit identifier. A matching unit identifier means that a unit identifier in the first document is found to be same as a unit identifier in the second document. These matching unit identifiers indicate corresponding data units of the first and second documents. A non-matching unit identifier means that a unit identifier in one of the first and second documents cannot be found to be same as any unit identifier in the other of the first and second documents. Each of the non-matching unit identifiers indicates a data unit of one of the first and second documents that does not correspond with any data unit of the other of the first and second documents.

Operational flow proceeds to a comparison operation 708. The comparison operation 708 determines whether or not any unit identifier in one of the first and second document matches any unit identifier in the other of the first and second document. If the comparison operation 708 determines that a unit identifier in one of the first and second document does not match any unit identifier in the other of the first and second document, then operational flow branches "No" and operational flow proceeds to an operation 710. At the operation 710, the data unit associated with the non-matching unit identifier is directly inserted into the third document.

If the comparison operation 708 determines that a unit identifier in one of the first and second document matches any unit identifier in the other of the first and second document, then operational flow branches "Yes" and operational flow proceeds to an operation 712.

At the operation 712, the document processing application compares edit identifiers of the data units associated with the matching unit identifiers to ascertain matching edit identifiers. Each of the matching edit identifiers indicates the data unit of one of the first and second documents matches the corresponding data unit of the other of the first and second documents. On the other hand, each of the non-matching edit identifiers indicates the data unit of one of the first and second documents does not match the corresponding data unit of the other of the first and second documents.

Operational flow proceeds to a comparison operation 714. The comparison operation 714 determines whether or not the edit identifiers of the data units associated with the matching unit identifiers match each other. If the comparison operation 708 determines that the edit identifiers match each other, then operational flow branches "Yes" and operational flow proceeds to the operation 710. At the operation 710, the data unit associated with the matching unit identifiers and the matching edit identifiers is directly inserted into the third document.

If the comparison operation 714 determines that the edit identifiers of the data units associated with the matching unit identifiers do not match each other, then operational flow branches "No" and operational flow proceeds to the operation 716. At the operation 716, the data units associated with the matching unit identifiers and the non-matching edit identifiers are merged into a data unit to the third document. This can be done, for example, using a convention merging process such as a three-way merge algorithm. Other conventional merging processes can also be used.

The example shown in FIG. 7 shows a method of merging two documents together to a merged third document. However, it is not limited to merging two documents. Instead, the concept and principle illustrated herein can apply to merging more than two documents.

Figure 8:
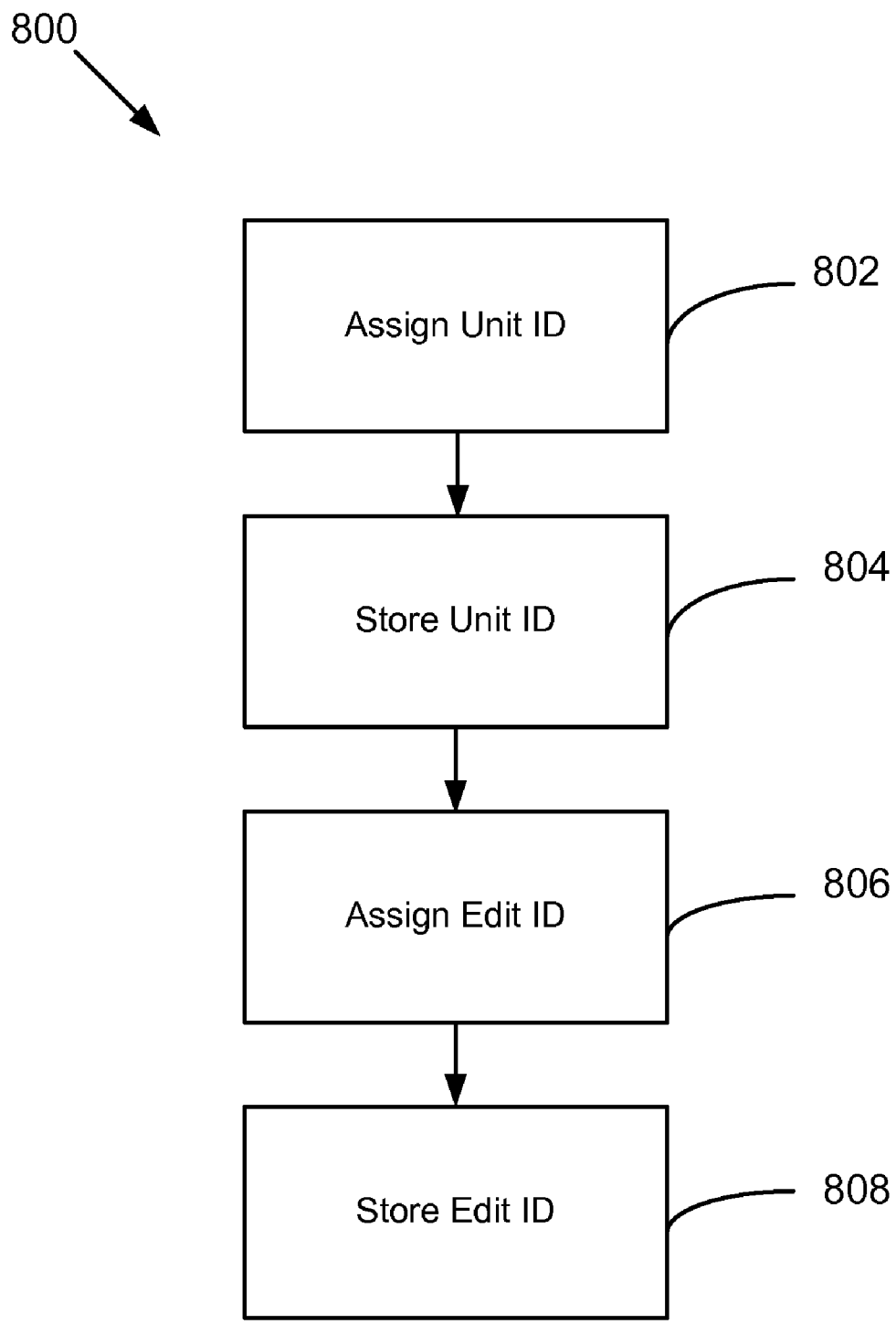
FIG. 8 illustrates an example method of assigning and storing a unit identifier and an edit identifier to each data unit of a document.

FIG. 8 illustrates an example method 800 of assigning and storing a unit identifier and an edit identifier to each data unit of a document. In particular, at operation 802, a unit identifier is assigned to each data unit of the document. The unit identifier is unique and persistent. The unit identifier persists for the life of the data unit. The unit identifier identifies and distinguishes the associated data unit from any other data units in the document.

Operational flow proceeds to an operation 804. At the operation 804, the unit identifiers are stored within the document. In one possible embodiment, the unit identifiers are stored in a metadata within the document. In another possible embodiment, the unit identifiers are stored in a metadata file which is separated from the document.

Operational flow proceeds to an operation 806. At the operation 806, an edit identifier is assigned to each data unit of the document whenever the data unit is created or edited. Thus, the edit identifier indicates that the data unit is newly created or edited. The edit identifier is separated from the unit identifier. The newly assigned edit identifier is different from and replaces previous edit identifier (if any) of the data unit when the edit identifier is assigned to the data unit. In one possible embodiment, the edit identifier is randomly generated. In other words, the edit identifier can be assigned with a random identifier.

Operational flow proceeds to an operation 808. At the operation 808, the edit identifiers are stored within the document. In one possible embodiment, the edit identifiers are stored in a metadata within the document. In another possible embodiment, the edit identifiers are stored in a metadata file which is separated from the document. In yet another possible embodiment, when the user saves the document, the edit identifiers are stored therewith.

Figure 9:
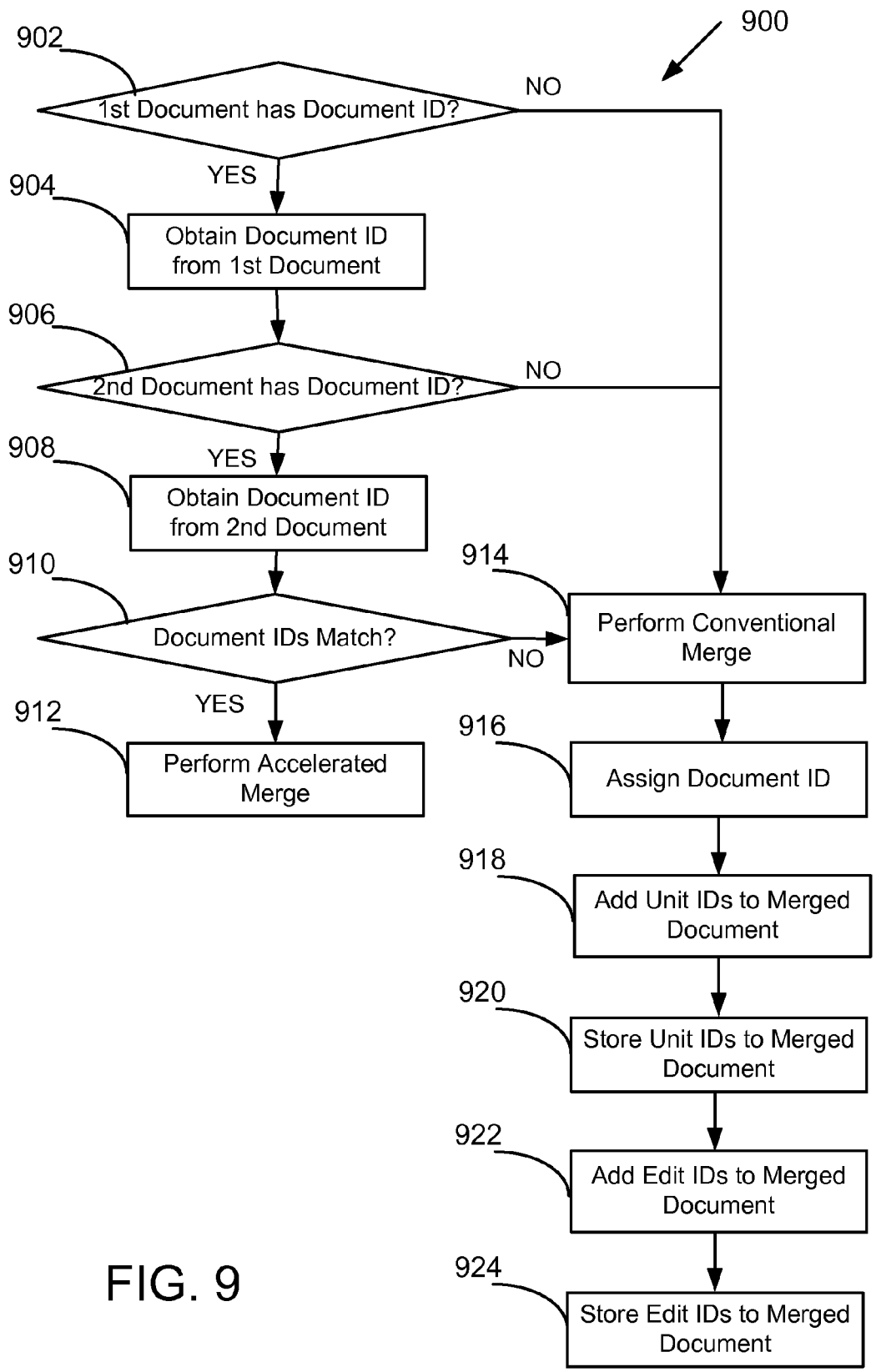
FIG. 9 illustrates another example method of merging a first document with a second document to generate a merged document.

FIG. 9 illustrates another example method 900 of merging a first document with a second document to generate a merged document. A document processing application is configured to merge together the first and second documents to generate the merged document. The method 900 particularly illustrates how to process the first and second documents which may not have a document identifier associated with the first and/or second documents. In other words, in one possible embodiment, the method 900 shows how to retroactively handle documents created and/or edited by previous versions of a document processing application. The method 900 illustrates how the document processing application handles document backward compatibility with previous application versions.

Operational flow starts at an operation 902. The operation 902 determines whether the first document has a first document identifier associated with the first document. If the operation 902 determines that the first document does not have a first document identifier associated with it, then operational flow branches "No" and operational flow proceeds to an operation 914 (to be discussed in detail below). If the operation 902 determines that the first document has a first document identifier associated with the first document, then operational flow branches "Yes" and operational flow proceeds to an operation 904. At the operation 904, the first document identifier is obtained from the first document.

Operational flow proceeds to an operation 906. The operation 906 determines whether the second document has a second document identifier associated with the second document. If the operation 906 determines that the second document does not have a second document identifier associated with the second document, then operational flow branches "No" and operational flow proceeds to an operation 914. If the operation 906 determines that the second document has a second document identifier associated with the second document, then operational flow branches "Yes" and operational flow proceeds to an operation 908. At the operation 908, the second document identifier is obtained from the second document.

Operational flow proceeds to a comparison operation 910. The comparison operation 910 determines whether the first document identifier of the first document matches the second document identifier of the second document. If the comparison operation 910 determines that the first document identifier of the first document matches the second document identifier of the second document, then operational flow branches "Yes" and operational flow proceeds to an operation 912. At the operation 912, an accelerated document merge is performed as discussed above in FIGS. 7-8. If the comparison operation 910 determines that the first document identifier of the first document does not match the second document identifier of the second document, then operational flow branches "No" and operational flow proceeds to an operation 914. At the operation 914, a conventional document merge is performed.

After the conventional document merge is completed at the operation 914. Operational flow proceeds to an operation 916.

At the operation 916, a document identifier is assigned to the merged document. The document identifier is unique and persistent. The document identifier persists for the life of the merged document.

Operational flow proceeds to an operation 918. At the operation 918, each data unit in the merged document is assigned a unique unit identifier that persists for the life of the data unit. The unit identifier identifies and distinguishes the associated data unit from any other data units in the merged document.

Operational flow proceeds to an operation 920. At the operation 920, the unit identifiers are stored within the merged document. In one possible embodiment, the unit identifiers are stored in a metadata within the document. In another possible embodiment, the unit identifiers are stored in a metadata file which is separated from the merged document.

Operational flow proceeds to an operation 922. At the operation 922, an edit identifier is assigned to each of the data units. The edit identifier indicates that the data unit is newly created or edited. The edit identifier is separated from the unit identifier.

Operational flow proceeds to an operation 924. At the operation 924, the edit identifiers are stored within the merged document. In one possible embodiment, the edit identifiers are stored in a metadata within the merged document. In another possible embodiment, the edit identifiers are stored in a metadata file which is separated from the merged document. In yet another possible embodiment, the edit identifiers are stored when a user saves the document. In addition, an edit identifier can be assigned with a random identifier.

After the operations 916-924, the merged document is converted into a document which is ready for an accelerated merge when the merged document is edited and/or duplicated later. For example, if the merged document is modified to a fourth document by one user and to a fifth document by another user, the fourth document and the fifth document can be merged in an accelerated merge method as described above.

The example shown in FIG. 9 illustrates a method of merging two documents together to a merged third document. However, it is not limited to merging two documents only. Instead, the concept and principle illustrated herein can apply to merging more than two documents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of merging a first document with at least a second document to generate a third document, each of the first and second documents including one or more data units, each data unit being associated with a unit identifier and an edit identifier, the method comprising:
   obtaining the unit identifiers associated with the data units of the first document;
   obtaining the unit identifiers associated with the data units of the second document;
   comparing the unit identifiers of each of the first and second documents to the unit identifiers of the other of the first and second documents to determine whether each of the unit identifiers is a matching unit identifier or a non-matching unit identifier, wherein each of the matching unit identifiers indicates corresponding data units of the first and second documents, and wherein each of the non-matching unit identifiers indicates a data unit of one of the first and second documents that does not correspond with any data unit of the other of the first and second documents;

comparing edit identifiers of the data units associated with the matching unit identifiers to ascertain matching edit identifiers, each of the matching edit identifiers indicating the data unit of one of the first and second documents matches the corresponding data unit of the other of the first and second documents;

inserting directly into the third document data units of the first and second documents that are associated with non-matching unit identifiers;

inserting directly into the third document data units of the first and second documents that are associated with matching unit identifiers and matching edit identifiers; and merging into the third document data units of the first and second documents that are associated with matching unit identifiers and non-matching edit identifiers.

2. The method of claim 1, wherein:
the unit identifiers of the data units of the first document are stored within the first document.

3. The method of claim 1, further comprising:
assigning a new edit identifier to one data unit of the first document when the one data unit is edited; and
storing the new edit identifier within the first document.

4. The method of claim 3, wherein storing the new edit identifier comprises storing the new edit identifier when a user saves the first document.

5. The method of claim 3, wherein the new edit identifier is randomly generated.

6. The method of claim 1, wherein obtaining the unit identifiers of the data units of the first document comprises obtaining paragraph identifiers of paragraphs of the first document.

7. A document processing system comprising:
a system memory;
a processing unit that executes instructions stored on the system memory to create a document processing application configured to merge together at least two documents to generate a third document;
a first document configured to be processed by the document processing application, the first document storing content and metadata, the content of the first document including at least one data unit, the metadata of the first document including a unit identifier and an edit identifier associated with each data unit, the unit identifier of each data unit being generated when the data unit is created, the edit identifier of each data unit being generated when a modification to the data unit is saved;
a second document configured to be processed by the document processing application, the second document including at least one data unit,
wherein the document processing application is configured to:
compare the unit identifiers of the first document to unit identifiers of the second document to determine whether each of the unit identifiers is a matching unit identifier or a non-matching unit identifier, wherein each of the matching unit identifiers indicates corresponding data units of the first and second documents, and wherein each of the non-matching unit identifiers indicates a data unit of one of the first and second documents that does not correspond with any data unit of the other of the first and second documents;
compare edit identifiers of the data units associated with the matching unit identifiers to ascertain matching edit identifiers, each of the matching edit identifiers indicating the data unit of one of the first and second documents matches the corresponding data unit of the other of the first and second documents;

insert directly into the third document data units of the first and second document that are associated with non-matching unit identifiers;

insert directly into the third document data units of the first and second documents that are associated with matching unit identifiers and matching edit identifiers; and merge into the third document data units of the first and second documents that are associated with matching unit identifiers and non-matching edit identifiers.

8. The document processing system of claim 7, wherein the document processing application is configured to generate the unit identifier of each data unit when the data unit is created.

9. The document processing system of claim 7, wherein the document processing application is configured to generate the edit identifier of each data unit when the modification is stored within the first document.

10. The document processing system of claim 7, further comprising:
a metadata file associated with the second document and stored separately from the second document, the metadata file including metadata pertaining to the content of the second document, the metadata of the metadata file including a unit identifier indicating to which data unit the metadata pertains.

11. The document processing system of claim 10, wherein the metadata stored in the metadata file is associated with the data unit indicated by the unit identifier included in the metadata.

12. The document processing system of claim 7, wherein the document is a text document.

13. The document processing system of claim 7, wherein the data unit is a paragraph.

14. A computer-readable storage medium having computer-executable instructions for implementing a method of generating a merged document from a first document and a second document, the method comprising:
determining whether the first document has a first document identifier, the first document identifier identifying the first document;
obtaining the first document identifier if the first document has a first document identifier;
determining whether the second document has a second document identifier, the second document identifier identifying the second document;
obtaining the second document identifier if the second document has a second document identifier;
comparing the first document identifier of the first document with the second document identifier of the second document;
performing a conventional merge of the first and second documents to generate the merged document if any of the first and second documents does not have a document identifier;
performing a conventional merge of the first and second documents to generate the merged document if the first document identifier of the first document differs from the second document identifier of the second document; and
performing an accelerated merge of the first and second documents to generate the merged document if the first document identifier of the first document matches the second document identifier of the second document.

15. The computer-readable storage medium of claim 14, wherein performing the accelerated merge comprises:

- identifying which data units of the first document match data units of the second document by comparing unique, persistent identifiers of each data unit of the first document to unique, persistent identifiers of each data unit of the second document;
- inserting the identified data units into the merged document directly to create data units of the merged document; and
- merging each data unit of one of the first and second documents that does not match any data unit of the other of the first and second documents using a conventional merge to further create the data units of the merged document.

16. The computer-readable storage medium of claim 15, wherein comparing the unique, persistent identifiers of each data unit of the first document to the unique, persistent identifiers of each data unit of the second document comprises:

comparing a unit identifier and an edit identifier of each data unit of the first document to a unit identifier and an edit identifier of each data unit of the second document.

17. The computer-readable storage medium of claim 14, wherein the method further comprises:

- adding unique, persistent identifiers to each of the data units of the merged document if any of the first and second documents does not have a document identifier; and
- adding unique, persistent identifiers to each of the data units of the merged document if the document identifier of the first document differs from the document identifier of the second document.

18. The computer-readable storage medium of claim 17, wherein adding the unique, persistent identifiers to each of the data units of the merged document comprises storing the unique, persistent identifiers within the merged document.

* * * * *